March 1, 1960 J. R. HAMMEL, JR., ET AL 2,926,605
BLASTING MATS
Filed Sept. 23, 1958

INVENTORS.
James R. Hammel, Jr.
John E. Smith
BY William W. Goffort

Webb, Mackey + Burden

THEIR ATTORNEYS

United States Patent Office
2,926,605
Patented Mar. 1, 1960

2,926,605

BLASTING MATS

James R. Hammel, Jr., Elizabeth, John E. Smith, Clairton, and William W. Goffort, Pittsburgh, Pa.

Application September 23, 1958, Serial No. 762,808

6 Claims. (Cl. 102—22)

This invention relates to blasting mats used in blasting stone, rock, minerals, hard and packed soil and other subjects of blasting and in particular, to blasting mats made from sections of vehicle tire casings held together by cable or other suitable means.

Heretofore, some blasting mats have been made from vehicle tire casings which have had part of the side walls of the casing removed therefrom. The part of the side walls removed from the casings has included the bead or rim portion of the casing together with a part of the side wall which is connected to, or integral therewith. Removal of the part of the side wall and the bead or rim portion of the casing materially reduces the strength and rigidity of a mat made from sections of such casings because the bead contains strands of wire disposed therein. These strands of wire add appreciable strength and rigidity to the tire casing and consequently, to a section of a tire casing which is used in the construction of blasting mats.

We have developed a blasting mat which has good strength and rigidity to withstand substantial detonations and which is lightweight so that it may be easily moved from one location to another. Specifically, our blasting mat comprises a plurality of sections of vehicle tire casings with each section having tire tread, the two side walls of the casing and the bead or rim of each side wall. The sections are arranged in two layers with each layer comprising at least one row of sections disposed side by side with a side wall of one section abutting a side wall of an adjacent section. One of the two layers is superimposed on the other with the tread of the sections of each layer facing outwardly and forming the top and bottom of the mat. The sections of one layer are arranged relative to the sections of the other layer so that abutting side walls of two adjacent sections of one layer are positioned between the two side walls of a section of the other layer. The ends of the tread of the sections in one layer are located substantially at the midportion of the sections of the other layer so as to form an overlapping of one row of sections in one layer with the sections of a row of the other layer. Cable means extend through the side walls of each section of each row in a layer with at least one of the cable means extending through the side walls of each section of a row of one layer and of each section of a row of the other layer so that the cable holds the sections of a row together and also the two layers superimposed one upon the other.

In the accompanying drawings, we have shown a preferred embodiment of our invention in which.

Figure 1:
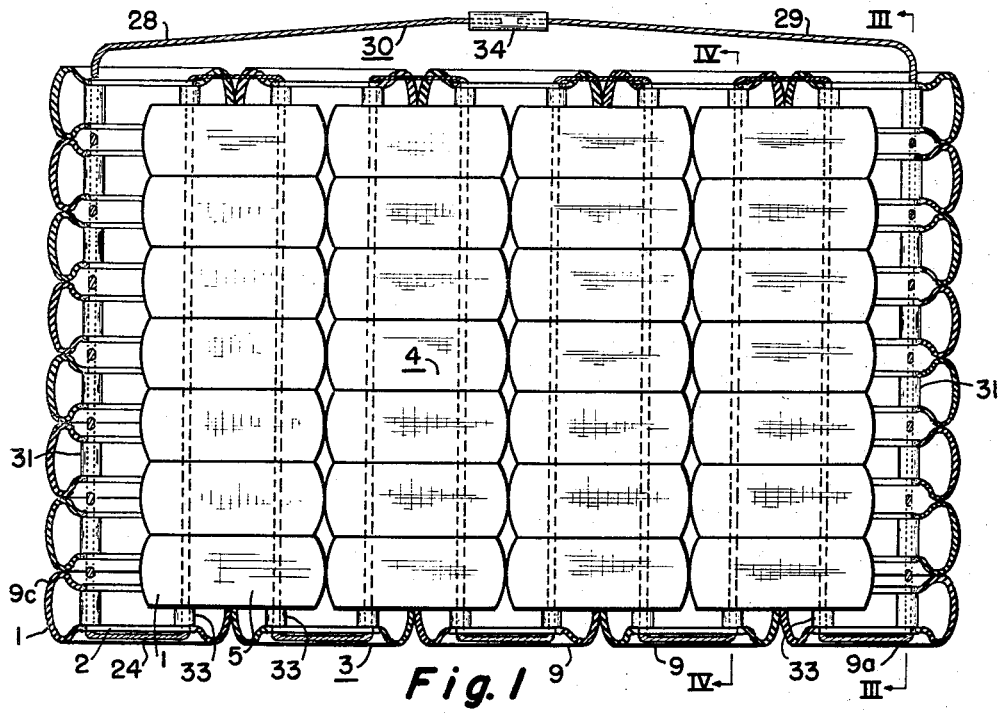
Figure 1 is a plan view of a blasting mat embodying our invention.

As shown in Figures 1–4, inclusive, our blasting mat comprises a plurality of sections 1 of vehicle tire casings 2 arranged in two layers 3 and 4 with one layer 4 superimposed upon the other layer 3. Each section has the tread 5 of the casing, the two side walls 6 and 7 of the casing, and the bead 8 or rim of each side wall with strands 27 of wire running therethrough. In other words, each section has the three parts of a tire casing, i.e., the tread, the two side walls, and the bead or rim of each side wall.

The sections in a layer are arranged in rows 9 with the rows being disposed in tandem as shown in Figure 1 and in a row, the sections are disposed side by side with a side wall of one section abutting a side wall of an adjacent section. As shown, the sections are positioned so that the tread of the sections of each layer faces outwardly and forms the top and bottom of the mat (Figure 2).

We arrange the sections of one layer relative to the sections of the other layer so that the abutting side walls of two adjacent sections of one layer are disposed between the two side walls of two sections of the other layer disposed end to end to effect an interlocking of the sections of one layer with the sections of another layer. For example, referring to sections 1a, 1b and 1c of layer 3, side wall 6a of section 1a and abutting side wall 7b of section 1b in row 9a are disposed between side walls 6d and 7d of section 1d of the other layer 4 and side wall 7a and abutting side wall 6c of sections 1a and 1c are disposed between side walls 6e and 7e of section 1e of the other layer 4. Except for the sections in the end rows 9a and 9c of layer 3, the two abutting side walls of two sections in a row in one layer are disposed between the two side walls of two sections arranged end to end in the other layer.

The ends 10 and 11 of the tread of sections in one layer 4 extend to substantially the middle part of two sections of the other layer 3 which two sections are disposed end to end. Likewise, the ends 12 and 13 of the sections of layer 3, except for the section in the end rows 9a and 9c, extend to substantially the middle part of two sections of layer 4. Accordingly, there is an interlocking of the sections of one layer with the sections of the other layer.

Figure 2:
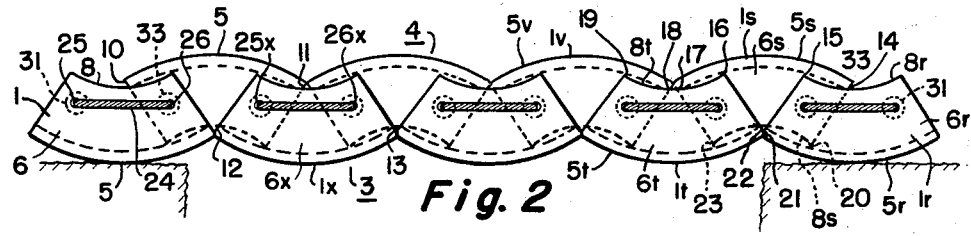
Figure 2 is a side elevation view of the blasting mat of Figure 1.
Figure 3:
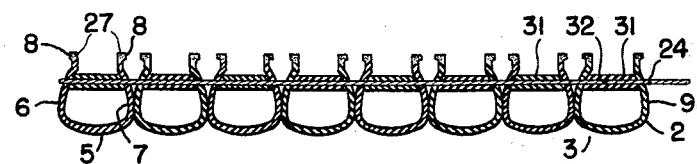
Figure 3 is a section view along the line III—III of Figure 1.

As shown in dotted lines in Figure 2, the bead of the side walls of the sections in one layer engage the inside of the tread of the sections of the other layer. Specifically, bead 8r of side wall 6r of section 1r in layer 3 engages the inside of tread 5s of section 1s in layer 4 at points 14 and 15. Also bead 8t of side wall 6t of section 1t in layer 3 engages the inside of tread 5s of section 1s in layer 4 at points 16 and 17 and engages the inside of tread 5v of section 1v in layer 4 at points 18 and 19. Likewise the bead 8s of side wall 6s of section 1s in layer 4 engages the inside of the tread 5r of section 1r in layer 3 at points 20 and 21 and engages the inside of the tread 5t of section 1t in layer 3 at points 22 and 23. The other sections of layers 3 and 4 are similarly arranged. This engagement of the beads of the sections of one layer with the inside of the treads of the sections of the other layers imparts support for each layer and adds strength and rigidity to the mat.

Cable 24 holds the sections in a row in position and maintains layer 4 superimposed upon layer 3. The cable extends through two holes 25 and 26 in each side wall with the outside side wall of a section at the end of a row having the cable extending across the side wall from one hole to another, namely from hole 25x to hole 26x in side wall 6x of section 1x. As shown in Figure 1, the cable extends in substantially straight lines through the sections of a row and through both the sections of one layer and the sections of the other layer superimposed upon the one layer in the interlocking manner described. By locating the cable in substantially straight lines through a row, it is relatively easy to replace a damaged section.

A clamp 34 holds together the ends 28 and 29 of the cable 24 and thus a loop 30 is formed for use in pulling the mat along the ground.

The cable 24 need not be a continuous long length but may be a plurality of short lengths with one short length extending down one row of sections and back an adjacent row with the ends of the short length joined together at the side wall of a section at the end of a row of sections.

Eyelets (not shown) are inserted into the holes 25 and 26 in the casing side walls to protect the casings from cutting action of the cable.

Preferably, the sections of tire casings used in our mats comprise from about ⅛ to about ⅓ segments of the tire casing. In other words, the sections are from about ⅛ to about ⅓ of the whole casing. Where the sections are smaller than about ⅛ of a casing, they lack adequate strength and rigidity because the amount of tread, side walls and bead is insufficient to impart good strength and rigidity to that section and thereby reduce the effectiveness of the mat during blasting. In addition, where the sections are too small, the two holes in each side wall through which the cable extends are too close together and thus the side wall is weakened as is the section itself. Also, where the sections are too small, they do not interlock together as effectively as if they are from about ⅛ to ⅓ of a whole casing. In this regard, the two abutting side walls of sections disposed side by side in a row of one layer do not extend a sufficient distance in between the two side walls of a section of the other layer and thus bring about a good interlocking of one layer with the other.

We have found that where the sections are substantially larger than ⅓ of a segment of a casing, the mat lacks a degree of flexibility possessed by a mat made from sections of ⅛ to about ⅓ of a tire casing. This flexibility is important for it permits the mat to be easily and quickly moved from one location to another by one or two men or a tractor or other comparable machine. Furthermore, sections which are too large do not interlock well and may require that the bead of the side wall be cut or slotted somewhere between its ends to render the section more flexible and thereby bring about a better interlocking of the sections. Cutting of the bead weakens the entire section and, of course, reduces rigidity and strength of the mat.

Spacer bars 31 located between the side walls of the sections in end rows 9a and 9c of layer 3 impart rigidity to the mat. Each spacer bar has a bore 32 which extends lengthwise therethrough and through which the cable 24 runs.

Figure 4:
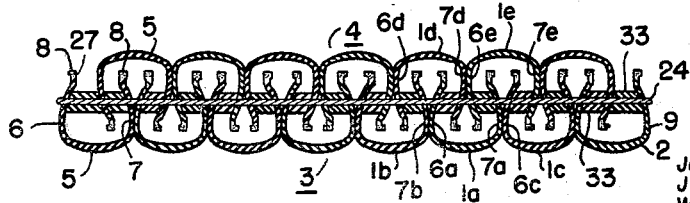
Figure 4 is a section view along the line IV—IV of Figure 1.

The rows intermediate the end rows of each layer likewise have spacer bars 33 disposed therein with a spacer bar being located between a side wall of a section of one layer and a side wall of a section of an adjacent layer as shown in Figure 4. The spacer bars of the intermediate rows also have a bore running lengthwise therethrough with the cable 24 extending through the bore. Use of the spacer bars in both the end rows and the intermediate rows render our mat strong and rigid and better able to withstand blasting charges than mats lacking the spacer bars. The spacer bars 31, which may be lengths of hose, also protect the casings from cutting action of the cable 24.

The bead portions of each section as pointed out have wire strands 27 located therein which strands add to the strength and rigidity of the sections.

The use of the entire side walls of the casing in each section improve the strength and rigidity of the mat as compared to mats made from sections of tire casings which have had the bead or rim portion and a part of the side walls cut off.

Our mat has outstanding damping capacity and good durability. It has ability to stay in position during blasting and may be readily and easily moved from one location to another.

Our invention is not limited to the preferred embodiments shown but may be otherwise embodied within the scope of the following claims.

We claim:

1. A blasting mat comprising a plurality of sections of vehicle tires, each section having the tire tread, the two side walls of the tire and the bead of each side wall, said sections being arranged in two layers with each layer comprising at least one row of sections disposed side by side with a side wall of one section abutting a side wall of an adjacent section, one of said two layers being superimposed on the other of said two layers with the tread of the sections of each layer facing outwardly and forming the top and bottom of the mat, the sections of one layer being arranged relative to the sections of the other layer so that abutting side walls of two adjacent sections of one layer are positioned between the two side walls of two sections of the other layer disposed end to end, cable means extending through the side walls of each section of each row in a layer with at least one of said cable means extending through the side walls of each section of a row in one layer and of each section of a row in the other layer, said cable means holding the sections of a row together and holding together the two layers superimposed one on the other.

2. The blasting mat of claim 1 characterized by spacer means disposed between the side walls of each section of the end rows of one layer, said cable means extending lengthwise through each spacer means.

3. The blasting mat of claim 1 characterized by spacer means between a side wall of a section of a row of one layer and a side wall of a section of a row of the other layer, and said cable means extending lengthwise through each spacer means.

4. The blasting mat of claim 1 characterized by spacer means disposed between the side walls of each section of the end rows of each layer and by spacer means disposed between a side wall of a section of a row of one layer and a side wall of a section of a row of the other layer, said cable means extending lengthwise through each spacer means.

5. The blasting mat of claim 1 characterized by said sections comprising from about ⅛ to about ⅓ of a tire casing.

6. The blasting mat of claim 1 characterized by the bead of a side wall of at least one section in one layer engaging the inside of the tread of a section in the other layer.

References Cited in the file of this patent

UNITED STATES PATENTS

| | | |
|---|---|---|
| 2,733,657 | Bryant et al. | Feb. 7, 1956 |

FOREIGN PATENTS

| | | |
|---|---|---|
| 132,993 | Sweden | Sept. 25, 1951 |
| 80,257 | Norway | May 26, 1952 |
| 139,965 | Sweden | Apr. 21, 1953 |
| 144,861 | Sweden | Apr. 13, 1954 |